United States Patent [19]

Wahl, III et al.

[11] 4,357,802

[45] Nov. 9, 1982

[54] GEOTHERMAL ENERGY PRODUCTION

[75] Inventors: Edward F. Wahl, III, Claremont; Frederic B. Boucher, San Juan Capistrano, both of Calif.

[73] Assignee: Occidental Petroleum Corporation, Los Angeles, Calif.

[21] Appl. No.: 132,407

[22] Filed: Mar. 21, 1980

Related U.S. Application Data

[63] Continuation-in-part of Ser. No. 875,139, Feb. 6, 1978, abandoned.

[51] Int. Cl.[3] .............................................. F03G 7/00
[52] U.S. Cl. .................................... 60/641.5; 60/641.3
[58] Field of Search ................. 60/641,2, 641.3, 641.5; 165/45

[56] References Cited

U.S. PATENT DOCUMENTS

| | | | |
|---|---|---|---|
| 3,827,243 | 8/1974 | Paull et al. | 60/641.2 |
| 3,864,917 | 2/1975 | Jacoby | 60/641.2 |
| 4,060,988 | 12/1977 | Arnold | 60/641.2 |
| 4,079,590 | 3/1978 | Sheinbaum | 60/641.2 |

Primary Examiner—Allen M. Ostrager
Assistant Examiner—Stephen F. Husar
Attorney, Agent, or Firm—Max Geldin; Barry Bisson

[57] ABSTRACT

Process for recovery of energy from geothermal fluids such as geothermal brine in a geothermal formation by injecting a water immiscible working fluid, preferably organic, typically a hydrocarbon, e.g. isobutane, into the geothermal formation containing a geothermal fluid such as hot brine, wherein the hydrocarbon working fluid is heated by direct heat exchange contact with the hot geothermal fluid in the formation, and employing the hot working fluid to drive a heat engine or turbine to produce work or electrical energy or to provide heat energy to a chemical process (e.g., alcohol manufacture). The cooled working fluid discharged from the turbine is reinjected into the geothermal formation. The working fluid preferably has a density which changes substantially with temperature to provide a substantial pressure difference for causing flow of heated working fluid up the production well. The density difference can be due to phase transfer from liquid to gas.

1 Claim, 8 Drawing Figures

X INJECTION WELLS
O PRODUCTION WELLS

X INJECTION WELLS
O PRODUCTION WELLS

GEOTHERMAL ENERGY PRODUCTION

BACKGROUND OF THE INVENTION

This application is a continuation-in-part of application Ser. No. 875,139, filed Feb. 6, 1978, now abandoned, the entire disclosure of which is incorporated herein by reference.

This invention relates to the production of energy from geothermal fluids such as hot geothermal brine, and is particularly directed to production of energy by direct contact heat exchange between certain working fluids and hot geothermal brine within a geothermal formation.

Geothermal formations exist in various locations beneath the surface of the earth, and which contain hot geothermal fluids, particularly fluids containing salts, such as hot geothermal brine. Since such geothermal fluids or brines generally contain dissolved solids such as sodium and magnesium chlorides, such geothermal fluids are highly scale depositing and sometimes corrosive and difficult to utilize in energy recovery equipment such as heat exchangers, piping, turbines and the like.

U.S. Pat. Nos. 3,957,108 and 3,874,174 disclose indirect heat transfer between hot brine in a geothermal formation and a working fluid such as isobutane to provide a heated working fluid for the production of power. However, these processes and systems also involve the disadvantage of incorporating indirect contact heat exchangers in the geothermal formation, with the disadvantages noted above.

U.S. Ser. No. 114,386, filed Jan. 22, 1980, of Edward F. Wahl III, disclosed a process for removing carbon dioxide from a vapor stream containing carbon dioxide and generated from a geothermal fluid, a geothermal recovery process which comprised introducing such vapor stream, containing carbon dioxide, into a vapor zone and introducing an aqueous alkaline solution into said condenser zone with contact with the vapor stream to thereby react with the carbon dioxide to form a carbonate and remove carbon dioxide from the vapor stream. This process can be useful in conjunction with the present invention to control $CO_2$ levels, said application Ser. No. 114,386 being incorporated herein by reference.

U.S. Pat. No. 3,827,243 discloses injection of isobutane into a dry geothermal formation, that is, one which contains no fluid, recovering the heated isobutane, using it to drive a turbine and recirculating the cooled working fluid in the system.

U.S. Pat. No. 3,988,895 discloses direct contact heat exchange between a working fluid such as isobutane and hot geothermal brine from a brine well, in a heat exchanger above ground and utilizing the heated working fluid for the production of power.

U.S. Pat. No. 4,043,386 also discloses direct contact heat exchange above ground between geothermal brine from a reservoir and a hydrocarbon.

The U.S. Pat. No. 4,060,988 discloses injecting an organic fluid into a geothermal formation via an injection well, forcing the fluid through the formation with simultaneous heating thereof and recovering the heated organic fluid via the production well, the heated fluid being employed to supply process heating requirements.

One object of the present invention, accordingly, is to provide a method for recovering energy from geothermal fluids such as geothermal brine in a geothermal formation. Another object is to provide a novel process of extracting energy from geothermal fluids while such fluids remain in situ in the formation. A still further object of the present invention is the provision of a method of the aforementioned type employing a working fluid which is selected to provide maximum energy output and wherein the working fluid is passed through an injection well into direct contact heat exchange relation with the hot geothermal fluid or hot geothermal brine within the formation, and the hot working fluid discharged from a production well is then used to produce energy, the working fluid being selected to provide maximum energy output. Still another object is to provide a process of the above type which provides for degassing the working fluid discharged from the production well, preventing calcium carbonate scale deposition when the working fluid is reinjected into its geothermal formation and increasing power output per well.

SUMMARY OF THE INVENTION

The above objects are achieved according to the invention, for recovery of energy from geothermal fluids such as geothermal brine in a geothermal formation, by injecting or introducing a water immiscible working fluid, preferably a hydrocarbon working fluid having certain physical characteristics, e.g. isobutane, into the geothermal formation containing a geothermal fluid such as hot brine, passing the hydrocarbon working fluid into direct contact heat exchange with the hot geothermal fluid in the formation, withdrawing the hot working fluid, and extracting energy from the hot working fluid. The cooled working fluid following extraction of energy therefrom, is then recirculated or reinjected into the geothermal formation or reservoir.

Fracturing the geothermal or reservoir rock formation can be employed to enhance the flow of the working fluid through the formation into contact with the hot geothermal fluid or brine therein, and thereby improve the direct contact heat transfer between the convecting hot fluid or brine and the working fluid.

For producing energy from a geothermal formation according to the invention, one or more injection wells are provided as by drilling into the formation and one or more production wells suitably spaced from the injection wells, are likewise provided in the formation. Thus, the hydrocarbon working fluid is injected through the injection well or wells, and into the porous or fractured geothermal formation into direct contact heat exchange with hot geothermal fluid or brine in the hot geothermal formation, whereby the hydrocarbon working fluid is heated, withdrawing the hot working fluid through one or more of the production wells, and extracting energy from the heated working fluid as by expansion in a work expander or turbine to produce work or generate electricity. If the geothermal formation is not sufficiently porous to permit the passage of the working fluid into the formation and into contact with the hot geothermal fluid or brine therein, as previously noted, the formation can be fractured in order to enhance the flow of working fluid through the geothermal formation into contact with the hot geothermal fluid or brine.

Following extraction of energy from the hydrocarbon working fluid in a work expander or turbine, the working fluid is recycled through the injection well or wells, back into the geothermal formation.

The injection of hydrocarbon working fluid into a geothermal formation or reservoir and extraction of such fluid to recover the heat from the geothermal reservoir has a number of advantages over conventional methods for recovering energy from geothermal brine. Thus, passage of the working fluid into direct heat exchange contact with the hot geothermal fluid or brine avoids the expense of incorporating heat exchangers into the geothermal formation, as in the above-noted prior art U.S. Pat. Nos. 3,957,108 and 3,874,174 to provide indirect contact heat exchange between the working fluid and the hot geothermal fluid, as well as the accompanying scaling and corrosion problems, resulting from the use of such heat exchangers. This also substantially reduces the capital cost and the operating expenses as contrasted to conventional geothermal energy recovery systems. Increased geothermal reservoir utilization and thermodynamic efficiencies also are achieved. The decrease in capital cost is realized because less wells are required for a given heat flow and no above ground or below ground heat exchangers are required. Decreased maintenance costs are achieved due to substantial avoidance of well plugging problems and the avoidance of scaling problems. Accordingly, the power output and efficiency are increased. Thus, power output per well can be achieved, of the order of 2 to 5 times that of a conventional geothermal energy recovery system. The power output of a 325° F., isobutane injection operated geothermal reservoir employed in the invention process becomes comparable to a 400° F., conventionally operated geothermal reservoir.

As a feature of the invention it has been found that by selecting an organic liquid, as working fluid, having a density which changes substantially with temperature, a substantial pressure difference can be provided, causing flow of heated working fluid up the production well. This density difference of the hot working fluid, e.g. hydrocarbon, flowing upward compared with downward flow of the relatively cool working fluid, together with viscosity difference, increases net power produced per well. Working fluids, such as napthenic lube oils, which have a low viscosity index, can be used.

Further, the working fluid discharged from the production well contains some brine and uncondensible gases, including $CO_2$. The brine is separated from the working fluid, and the separated brine is flashed to produce steam for expansion through a turbine as in a conventional geothermal flash power plant. The separated working fluid containing $CO_2$ is expanded in a work expander and cooled in a high pressure condenser. The working fluid dissolves the $CO_2$ in a water condenser, thus reducing power loss due to $CO_2$, which is considerable. The working fluid containing dissolved $CO_2$ is compressed, optionally heated by brine in a countercurrent heat exchanger and then re-injected into the injection well in the geothermal formation. The dissolved $CO_2$ aids in preventing deposition of calcium carbonate scale in the well.

THE DRAWINGS

The above and other features and advantages of the invention willl be more clearly understood by reference to the following detailed description of the invention, taken in connection with the accompanying drawing wherein.

DETAILED DESCRIPTION OF THE INVENTION

Figure 1:
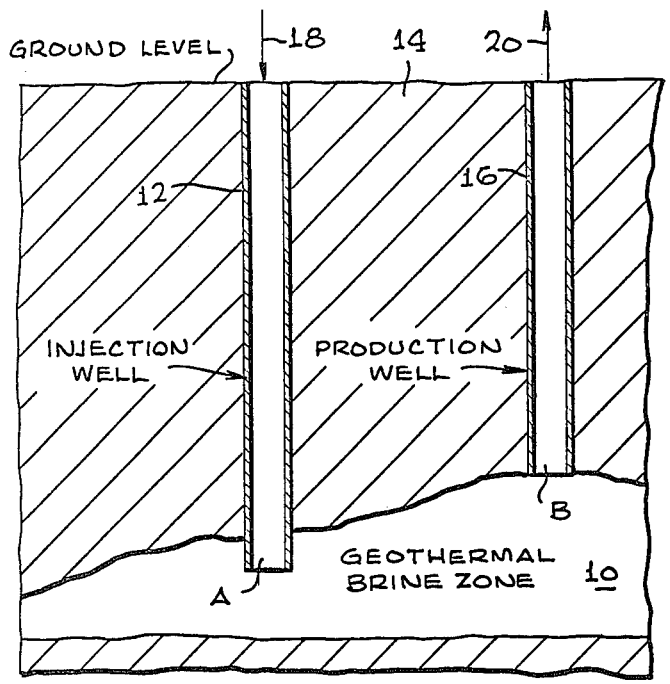
FIG. 1 is a diagrammatic view showing an injection well and a production well for recovery of geothermal energy according to the invention.

Referring to the drawing, numeral 10 represents a geothermal brine zone which can range in temperature from about 300° to about 1500° F., and usually ranges from about 300° to about 600° F. Pressures within the formation typically range from about 500 to about 5,000 psia, depending on well depth. Such geothermal brine is in the form of an aqueous solution of soluble salts such as sodium chloride and magnesium chloride, and can contain other soluble compounds such as potassium salts and alkaline substances.

A first well 12 can be drilled from ground level and through the upper rock formation 14 and into communication with the geothermal brine zone 10 containing hot geothermal brine. A secondary or production well 16 spaced from the first well 10 is drilled from ground level into the geothermal brine zone.

An immiscible working fluid is introduced at 18 and injected downwardly through the primary well 12 into the geothermal brine zone 10 into contact with the hot geothermal brine therein. Such working fluids can be any suitable material which is immiscible with water, and having a density different from the brine or hot water. Such working fluids preferably have a density less than the density of the hot brine or other hot water containing fluid.

Thus, the working fluid can be a hydrocarbon including aromatics, paraffins, naphthenes and olefins. Among the preferred working fluids are paraffin or olefinic hydrocarbons containing from about 1 to about 8 carbon atoms, either straight or branched chain such as methane, ethane, propane, n-butane, isobutane, n-pentane, isopentane, neopentane (2,2-dimethylpropane), n-hexane, cyclo-hexane, n-heptane, n-octane, i-octane and the analogous olefins such as n-butene, isobutene, and the like. Most desirably, paraffinic or olefinic hydrocarbons containing from about 3 to about 6 carbon atoms are employed. Aromatic hydrocarbons such as benzene, toluene, and xylene also can be used. Petroleum fractions, such as lube oils, can also be used (e.g., naphthenic, paraffinic or aromatic lubes, especially of low viscosity index, preferably below about 25).

The working fluid can be maintained, in whole or in part, in gas-phase while in the well. For example, in a concentric arrangement of injection and production wells (such as that in FIG. 3), relatively cool methane in gas or liquid phase, can be injected into a well containing a hot geothermal fluid and heated by direct contact heat exchange with said fluid. The hot methane can then be withdrawn in gas-phase through the production well piping and, at or near the surface, be brought into indirect (or, less preferred, direct) heat exchange with a second working fluid (which second working fluid, once heated, can be used for power production and/or process heat and/or for space heating). An entirely gas-phase working fluid, such as air or nitrogen, can be used in such a closed-loop system. The injection of air to reduce sulfide concentration in geothermal steam or brine or to enhance recovery of minerals and heat energy therefrom is an invention of Phillip La Mori and Robert Hard.

Mixtures of such hydrocarbons can also be utilized, such as, for example, a mixture of methane and ethane, ethane and propane, or propane and n-butane or petroleum fractions and blends thereof.

Working fluids other than hydrocarbons (e.g., fluorinated hydrocarbons, ethers, etc.) are also suitable provided they are not too viscous, have the proper density relation to the hot aqueous fluid or brine as noted above, and are immiscible in the brine.

Among the working fluids are n-butane and isobutane.

The working fluid is forced by pressurizing the fluid sufficiently, through the primary well 12 and into the geothermal brine zone 10. The working fluid flows in direct contact heat exchange relation through the hot geothermal brine in the brine zone 10 in the flow path created by the brine zone between the primary or injection well 12 and the secondary or production well 16, extracting heat from the hot geothermal brine and raising the temperature of the working fluid.

Figure 2:
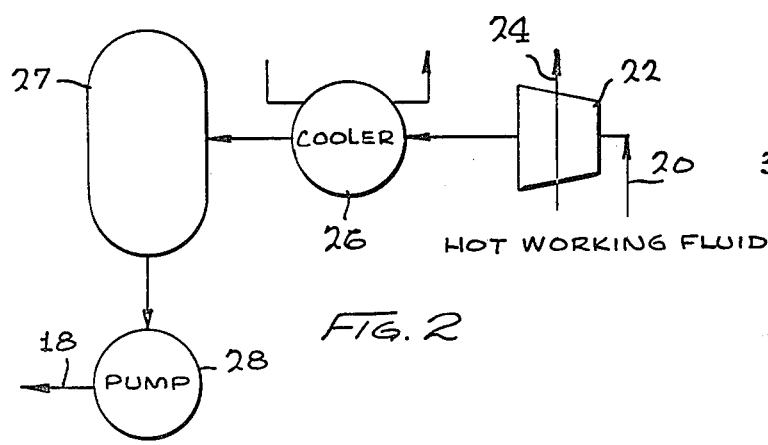
FIG. 2 is a diagram illustrating work expansion of the hot working fluid extracted from the geothermal formation, and recycling of the cooled expanded working fluid to the geothermal formation.

The hot working fluid, preferably having a density lower than that of the hot geothermal brine, passes upwardly through the production well 16 and is withdrawn from the production well at 20. Referring to FIG. 2, the hot working fluid at 20 is then fed to a work expander or turbine 22 for producing work which is taken off as shaft power at 24, and which can be employed to drive an electric generator (not shown). The expanded working fluid is then introduced into a cooler 26 for cooling and condensing the latter fluid (or is used for space heating or process heat; see the Application of La Mori and Zahradnick, filed Feb. 8, 1980), and the cooled fluid is passed to a collecting tank 27 from which the cooled working fluid is pumped by means of a pump 28 and recycled at 18 back to the injection well 12 for recirculation into direct heat exchange contact with the geothermal brine in the brine zone 10.

According to the invention, a working fluid or mixture of working fluids is selected so that the power output per well is maximized. This is accomplished by employing a working fluid whose density changes substantially with temperature. Thus the density of the selected working fluid which is heated adjacent to the lower end of the injection well in the geothermal formation, is substantially lower than the density of the incoming relatively cold working fluid passing through the injection well into the formation.

Typically, the change in density can range from about 4 lb/cu ft to about 25 lb/cu ft (typical fluid density can be about 5 to about 30 lb/cu ft) ambient. This produces a much greater pressure difference for causing flow of heated working fluid up the production well, resulting in the application of reduced pumping energy for the working fluid, and increases net power output produced per well. Among the working fluids are methane, ethane, propane and low viscosity index naphthenic or aromatic petroleum oil fractions having a viscosity at 100° F. of about 10-100 Saybolt universal seconds. Preferably, the working fluid is selected to have a greater densithy and/or viscosity change than would be found under the same conditions with a hydrocarbon containing 4 to 10 carbon atoms.

A factor for selecting a suitable working fluid is based on the difference in temperature between the geothermal formation and the brine therein, and the temperature of the cool working fluid injected into this formation. Specific working fluids or combinations of working fluids which can be selected having the above noted properties are, for example, isobutane, a mixture of isobutane and pentane, and a mixture of hexane and isobutane.

To facilitate the flow of working fluid through the hot geothermal fluid or hot geothermal brine in the formation, the geothermal formation can be fractured prior to injecting the working fluid into the formation. Such fracturing can be accomplished by known means, such as hydraulic fracturing or hydrofracturing, as well as by other techniques, such as explosive fracturing or liquid mining.

Referring to FIG. 1, the distance between the zone of injection at A of the working fluid into the geothermal brine zone 10 and the zone of extraction B of the hot working fluid from the brine zone 10 and into the production well 16 is governed by the distance required for the working fluid to approximately reach the temperature of the hot brine in the geothermal zone. This distance can range from about 50 ft to several hundred feet or more. It is advantageous to employ the minimum distance between injection and production wells for this purpose in order to achieve minimum flow of the working fluid in the lateral direction. It is also preferable that the inlet end at B of the production well 16 for withdrawing hot working fluid from the formation be at a level higher than the discharge end at A of the injection well 12 for injecting working fluid into the formation.

Generally a plurality of injection wells and a plurality of producing wells are provided and arranged in a preselected pattern in order to obtain high capacity and efficiency of heat transfer and geothermal energy recovery from the geothermal fluid or brine from a given geothermal formation. Such injection wells and producing wells can be vertical wells or slanted wells or a combination of vertical and slanted wells.

Figure 3:
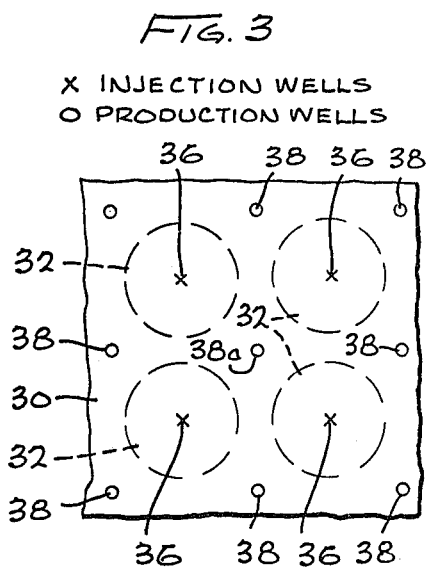
FIG. 3 is a diagram of a plan view of one network system of injection and producing wells for geothermal energy recovery according to the invention.
Figure 4:
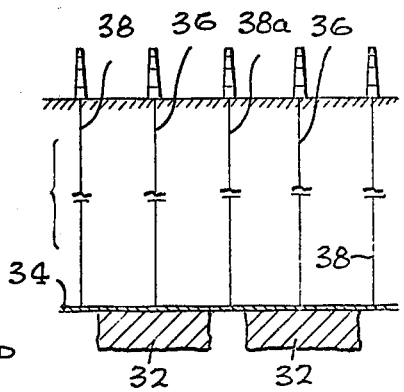
FIG. 4 is a vertical section of the network system of injection and producing wells shown in FIG. 3.

Thus, referring to FIGS. 3 and 4, there is shown a geothermal formation 30, e.g. of about 1,000 ft square, and which is vertically fractured to form two vertical fracture zones 32, and horizontally fractured, as indicated at 34.

There is provided in the formation 30, four approximately equally spaced injection wells 36 arranged in the form of a square, and each approximately centrally disposed with respect to the vertical fracture zones 32, with nine producing wells, eight of which at 38 are positioned outside the four injection wells, one of the producing wells 38a being positioned at the midpoint of the square formed by the four injection wells 36.

Figure 5:
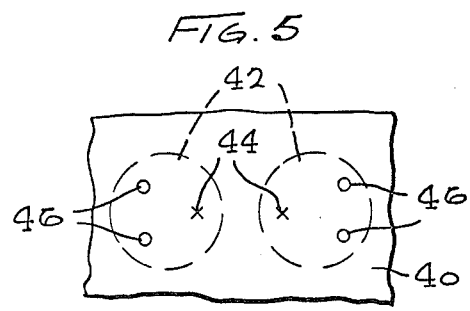
FIG. 5 is a plan diagrammatic illustration of an alternate network of injection and producing wells for working fluid injection according to the invention.
Figure 6:
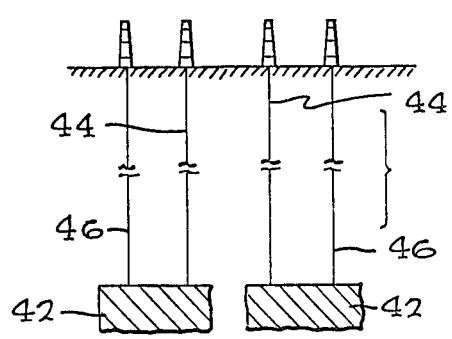
FIG. 6 is a diagrammatic vertical section of the network of wells shown in FIG. 5.

FIGS. 5 and 6 show an alternate arrangement or network of injection and production wells in a geothermal formation. Thus, in a geothermal formation 40 which has been vertically fractured at 42 into two vertical fracture zones to enhance flow of working fluid into contact with the geothermal fluid and heat transfer, there are provided two injection wells 44 suitably spaced from each other. Beyond the injection wells 44 there are provided four producing wells 46 arranged in the form of a rectangle, with the two injection wells 44 within the rectangle. One injection well 44 and two production wells 46 are arranged to communicate with each of the two vertical fracture zones 42.

With respect to maintaining minimized working fluid inventory, it is preferred that the depth or height of the vertical fracture zones ranges from about 10 to 200 ft, with the usual height of such vertical fracture zones being between about 20 and about 50 ft.

In both of the networks of injection and producing wells illustrated in FIGS. 3 and 5, the lateral distance between the respective injection and producing wells is such as to provide maximum heat transfer efficiency and throughput capacity of working fluid through the geothermal formations.

In one example of practice of the invention process, isobutane working fluid at a pressure of 1200 psia is injected through injection wells into a geothermal brine zone at a depth of 4600 ft. The hot brine in the brine zone is at a temperature of 400° F., and a pressure of 2,000 psia. Hot isobutane at a temperature of about 390° F., and 1200 psia pressure is withdrawn from the producing wells and introduced into a turbine for extraction of energy. The cooled and expanded isobutane at a temperature of 190° F., and 100 psia is condensed, and the resulting condensed isobutane working fluid which is at a temperature of 120° F., and at a pressure of 95 psia is again pumped up to a pressure of 1200 psia and recycled to the injection wells for reintroduction into the geothermal brine zone into direct contact heat exchange with the aqueous hot brine therein.

Figure 7:
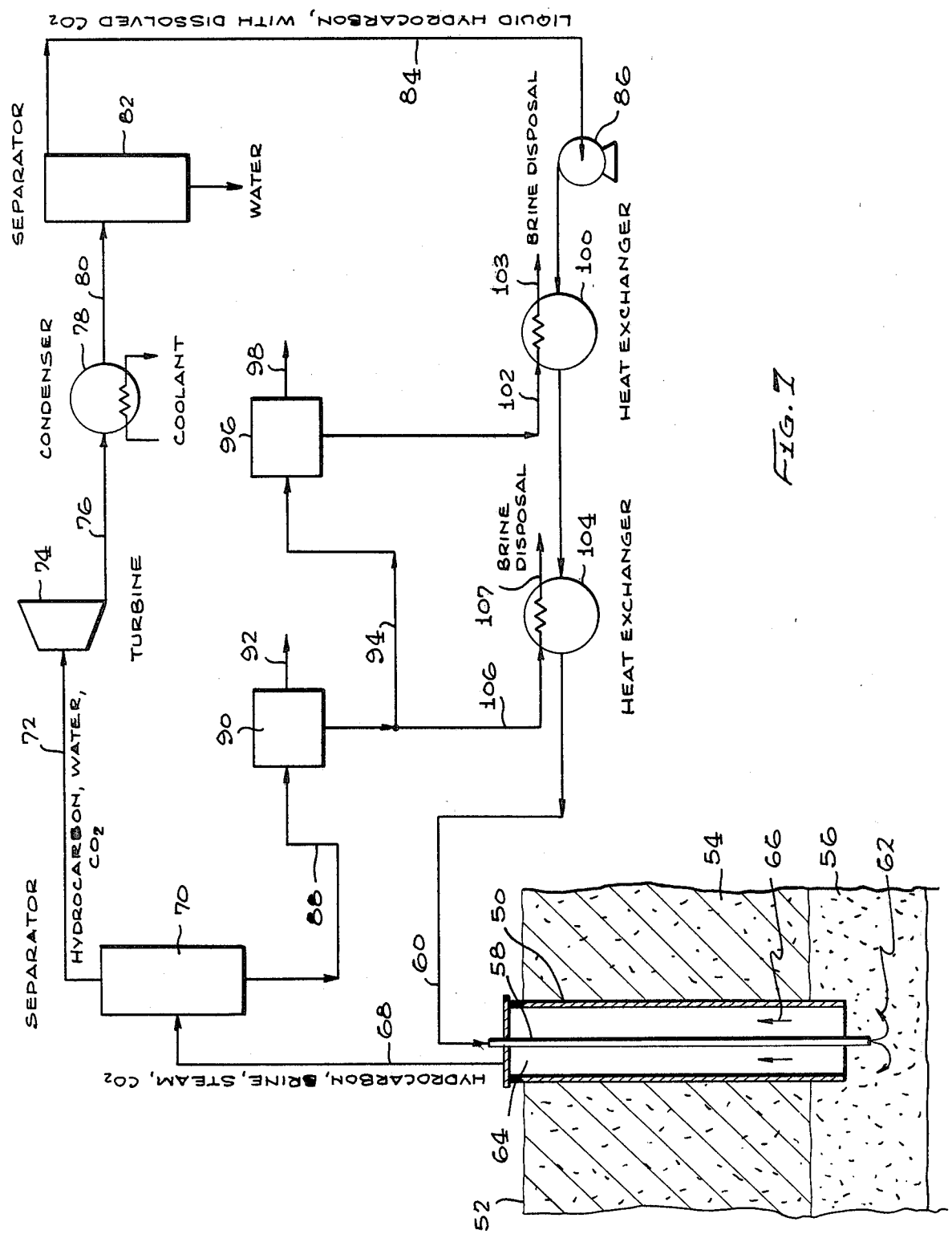
FIG. 7 is a schematic illustration of a preferred system for recovery of geothermal energy according to the invention.

Referring to FIG. 7 illustrating a preferred embodiment, a single well 50 extends from the earth surface 52 down through the upper formation 54 and penetrates the geothermal formation 56 containing hot brine, e.g. at a temperature of about 400° F. An inner pipe or tubing 58 extends axially within the well 50 and preferably terminates below the point where brine flashes, or optionally, down below the bottom of the well 50 and terminating in the geothermal formation 56.

Recycled working fluid, e.g. hydrocarbon, is introduced at 60 and injected through the inner pipe 58 into the hot geothermal formation and brine 56, and circulates upwardly in the formation as indicated by arrows 62, and the heated working fluid passes upwardly through the annulus 64 as indicated by arrows 66, between the inner pipe 58 and the well 50 and is withdrawn through pipe 68.

The hot working fluid or hydrocarbon, e.g. at a temperature of about 390° F. contains a small amount of brine and steam, together with noncondensible gas including $CO_2$. Thus, the volumetric ratio of hydrocarbon to brine in the hot hydrocarbon in pipe 68 can be about 1.5 to 1. The mixture of pressurized hot hydrocarbon, at a temperature of about 390° F. and about 600 psia pressure, is introduced into a separator 70, to separate the brine in the mixture, and the resulting mixture of hydrocarbon, water, $CO_2$ and other noncondensible gases at 72 is work expanded in a turbine 74. The cooled hydrocarbon at a temperature of about 190° F. and a pressure of about 100 psia, discharged from the turbine at 76 is introduced into a high pressure condenser 78.

The liquid hydrocarbon condensed in the high pressure condenser 78 dissolves the $CO_2$ present, and the resulting liquid mixture of hydrocarbon containing dissolved $CO_2$ and water is introduced at 80 into a separator 82 for removal of water.

The resulting liquid hydrocarbon containing dissolved $CO_2$ discharged at 84 from the separator 82, and at a temperature of about 120° F. and a pressure of about 95 psia is pumped up to a pressure of about 600 psia at pump 86 prior to reinjection by pipe 58 into the geothermal formation.

The hot brine withdrawn from the separator 70 is introduced at 88 into a first flash stage 90 of a conventional geothermal flash power plant, for production of steam at 92, and the cooled brine at 94 from the first stage of such power plant is introduced into a second stage flash 96 for generation of steam at 98.

Prior to injection of the pressurized liquid hydrocarbon and dissolved $CO_2$, via line 60 for reinjection into pipe 58, the liquid hydrocarbon with dissolved $CO_2$ is optionally passed through a first countercurrent heat exchanger 100 in indirect or direct heat exchange relation with brine at 102 discharged from the second stage brine flash 96 for heating the liquid hydrocarbon, and the resulting hydrocarbon is then optionally passed through a second countercurrent heat exchanger 104 in countercurrent heat exchange relation with some of the brine at 106 discharged from the first stage brine flash 90, for further heating the liquid hydrocarbon containing dissolved $CO_2$ and the resulting preheated liquid hydrocarbon at about 300° F. is then reinjected at 60 into the central injection well 58. The brine discharged at 103 and 107 from its heat exchangers 100 and 104 is sent to disposal as by reinjection into a disposal well.

In accordance with one of the features of the present invention, as noted above, a working fluid, e.g. hydrocarbon, fluorocarbon or mixtures thereof, is selected so that the power output per production well is maximized. For this purpose a criterion for selection of the working fluid is to select a fluid having physical characteristics such that there is a radical change of density and/or viscosity, when the relatively cool working fluid of high density and/or viscosity is injected into the injection well 58 as compared to the relatively low density and/or viscosity working fluid heated to high temperatures and discharged from the production well at 68. Thus. in the example above the working fluid will preferably have a change in density of about 50% or more when heated from its relatively cooled injection temperature of about 300° F. to its heated temperature of close to 400° F. when discharged from the production well at 68. Further, the hydrocarbon can be selected by system calculations for various hydrocarbons, the hydrocarbon with the best performance being selected. The system calculations consist of power cycle thermodynamics to determine power output, and hydrodynamic calculations on well flow. The net power output per well is a function not only of the thermodynamic properties and system configuration, but also of the flowrate of material from the well, consequently hydrodynamic calculations are also important in selecting the working fluid and system configuration.

In addition, the dissolution of carbon dioxide in the liquid hydrocarbon reinjected into the injection well at 58 tends to prevent calcium carbonate deposition within the well system. Such solution of $CO_2$ in the hydrocarbon in the high pressure condenser 78 also reduces power loss due to uncondensed $CO_2$.

It will be noted that the system shown in FIG. 7 and described above for treatment of heated liquid hydrocarbon containing $CO_2$ and steam for generation of power and recovery of liquid hydrocarbon containing dissolved $CO_2$ for reinjection, can also be applied to the system shown in FIG. 1, comprising separate spaced apart injection and production wells.

Figure 8:
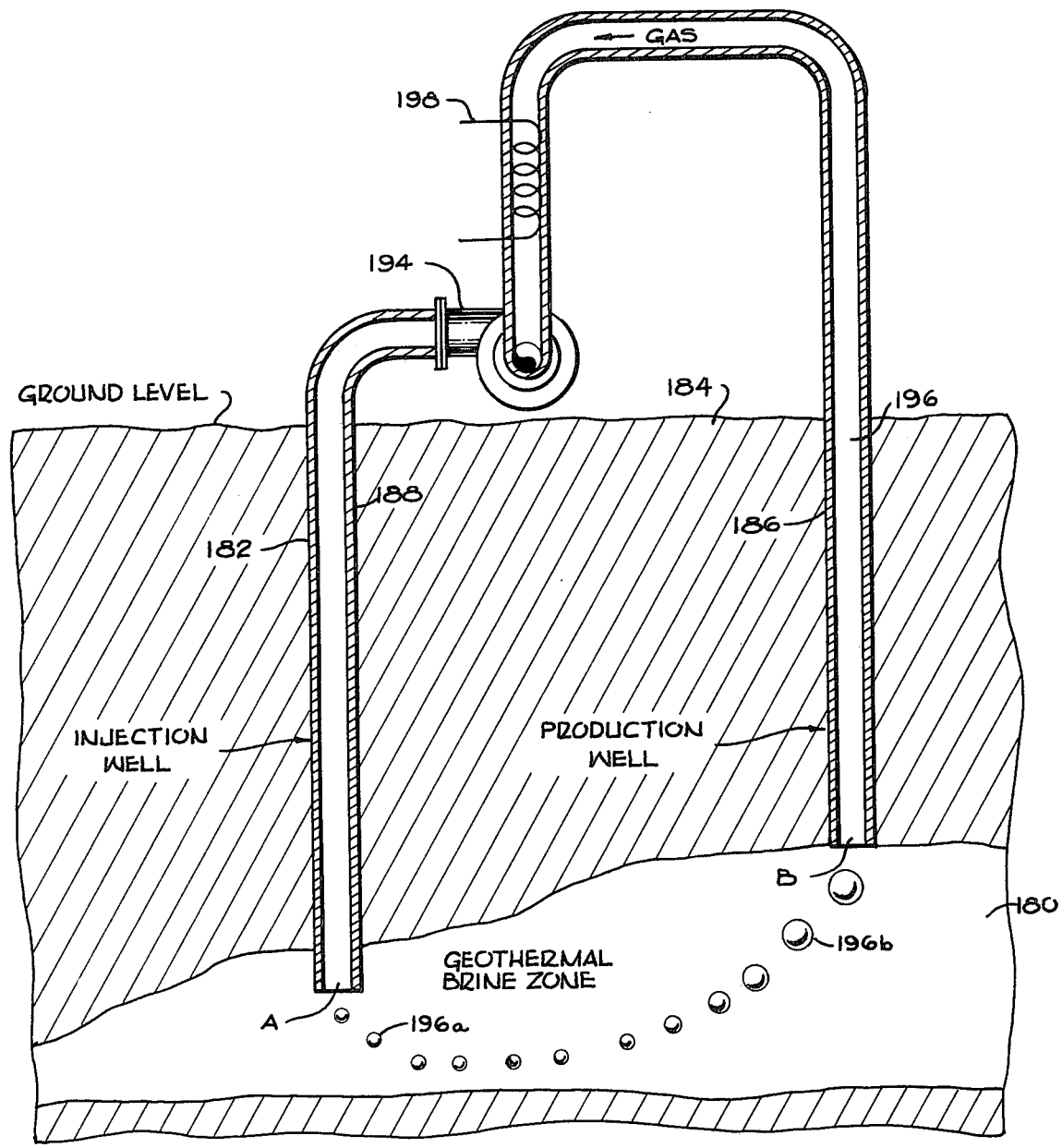
FIG. 8 is a schematic illustration of a closed-loop system wherein the hot working fluid, preferably in gas-phase, is contacted by indirect heat exchange, with a second working fluid (which provides the ultimate energy transfer).

FIG. 8 of the drawings illustrates the use of gas-phase (including mixed gas-liquid phase) direct contact heat exchange with a geothermal fluid 180 within a geothermal zone. In this embodiment, a water-immiscible working fluid (e.g., methane, $SO_2$, freon, nitrogen, etc.) in gas, liquid or mixed phase, is introduced into an injection well, as by an optional pump 194, through an impermeable conduit 182 which terminates A within the body of liquid geothermal brine 180. The working fluid, illustrated by small bubbles (e.g., 19a, which can be gas or liquid) which, due to pick-up of heat by direct contact with the brine, increase in size (and decrease in density) as they travel from the outlet A through the brine 180 in the geothermal zone until they reach the inlet B of a production well having a gas-impermeable conduit (186). The gas 196 travels upward through the conduit and can be caused to pass through a screen or grid or other type of particle separator, not shown (to remove rocks) and/or through a demister or liquid entrainment separator, not shown, such as the type described in U.S. Pat. No. 4,164,398 to Caesar. The hot, gas-phase working fluid is then brought into heat exchange 198 with another working fluid as by coil. Although indirect contact is illustrated in FIG. 8, this heat exchange can be direct and can be done as in connection with compression, so as to transfer the working fluid into liquid phase, thus taking advantage of the latent heat of vaporization of the working fluid. The heat depleted working fluid is then recycled to the injection well as by a pump 194.*

*The system is pressurized with makeup fluid by an external pump not shown.

Although the working fluid in contact with the brine is illustrated in individual bubble form, the rate of introduction into the well can be such that the working fluid is in a steady stream during at least part of the contact period.

From the foregoing, it is seen that the invention provides a novel and improved method for production of energy from a geothermal source containing a hot geothermal fluid such as hot brine, by direct injection of an immiscible working fluid, preferably a hydrocarbon such as isobutane, into a geothermal formation or reservoir for direct contact heat transfer between the hot geothermal fluid and the working fluid to produce a hot high pressure working fluid for recovery of thermal energy therefrom, while the geothermal fluid or brine remains essentially in place in the geothermal formation or reservoir. Fracturing the geothermal rock formation to enhance flow of the working fluid through and into direct contact heat exchange with the hot geothermal fluid can be utilized.

Although this invention has been particularly described for use in generating electrical power, it can also be useful in providing heat for use in chemical manufacture or other process, space or utility requirement. For example, in manufacture of alcohols or other products from fermentation, and/or hydrolysis and/or distillation as shown in the application of Phillip La Mori and Raymond Zahradnick, "Use of Geothermal Heat to Recover Alcohol and Other Valuable Products", filed Feb. 8, 1980, and incorporated herein by reference.

While particular embodiments of the invention have been described for purposes of illustration, it is understood that other modifications and variations will occur to those skilled in the art and the invention, accordingly, is not to be taken as limited except by the scope of the appended claims.

What we claim is:

1. A process for recovery of energy from geothermal fluids including geothermal brine in a geothermal formation, which comprises:
    (a) providing at least one injection well in a geothermal formation containing geothermal brine;
    (b) providing at least one production well in said formation, said injection well having a diameter less than said production well and being disposed axially within said production well, and providing an annulus between said injection well and said production well;
    (c) injecting a relatively cool pressurized hydrocarbon working fluid through said injection well and into said geothermal formation, and flowing said working fluid in direct contact heat exchange through said geothermal brine in said formation to heat said working fluid and produce a hot pressurized working fluid;
    (d) withdrawing said hot pressurized working fluid through said annulus, said hot pressurized working fluid containing brine, steam and uncondensible gas including $CO_2$;
    (e) separating said brine from said hot pressurized working fluid containing $CO_2$ and steam;
    (f) flashing said brine to flash off steam and employing said steam for power generation or process heat or both;
    (g) withdrawing brine from said flashing in step (f);
    (h) work expanding said hot pressurized working fluid containing $CO_2$ and steam from said separating step (e);
    (i) condensing the resulting mixture of working fluid, $CO_2$ and steam in a pressurized condenser;
    (j) withdrawing condensed water from said pressurized condenser;
    (k) withdrawing liquid working fluid containing dissolved $CO_2$ from said condenser;
    (l) compressing said liquid working fluid containing dissolved $CO_2$ from step (k) up to a predetermined pressure;
    (m) passing said pressurized working fluid containing dissolved $CO_2$ in countercurrent indirect heat exchange relation with said brine separated in step (f); and,
    (n) reinjecting said pressurized working fluid containing dissolved $CO_2$ from step (m) into said injection well, whereby the dissolved $CO_2$ in the hydrocarbon injected into the injection well prevents deposition of calcium carbonate in the well and increased the net power output per well.

* * * * *